(No Model.)

S. A. DARRACH.
STAND BRACE FOR BICYCLES.

No. 568,667. Patented Sept. 29, 1896.

WITNESSES:
William Miller
E. Wolff

INVENTOR
Samuel A. Darrach.
BY Hauff & Hauff
ATTORNEYS

UNITED STATES PATENT OFFICE.

SAMUEL A. DARRACH, OF NEWARK, NEW JERSEY.

STAND-BRACE FOR BICYCLES.

SPECIFICATION forming part of Letters Patent No. 568,667, dated September 29, 1896.

Application filed September 23, 1895. Serial No. 563,356. (No model.)

*To all whom it may concern:*

Be it known that I, SAMUEL A. DARRACH, a citizen of the United States, residing at Newark, in the county of Essex and State of New Jersey, have invented new and useful Improvements in Stand-Braces for Bicycles, of which the following is a specification.

This invention relates to bicycle-supports designed to sustain the wheel in an upright position, and has for its object to provide a novel, simple, and economical construction of parts which will accomplish the desired result and enable the supporting device to be adjusted to meet the conditions required, and when in its folded position to closely hug and lie against a part of the bicycle-frame, so that it presents no undue lateral projection.

The object of my invention is accomplished in the manner and by the means hereinafter described and claimed, reference being made to the accompanying drawings, in which—

Figure 1:
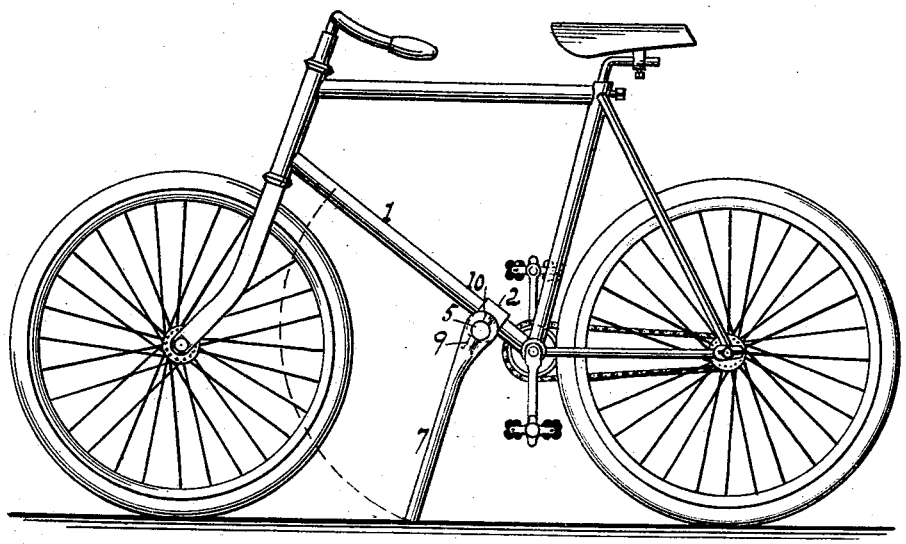
Figures 2, 3, 4, 5, 6:
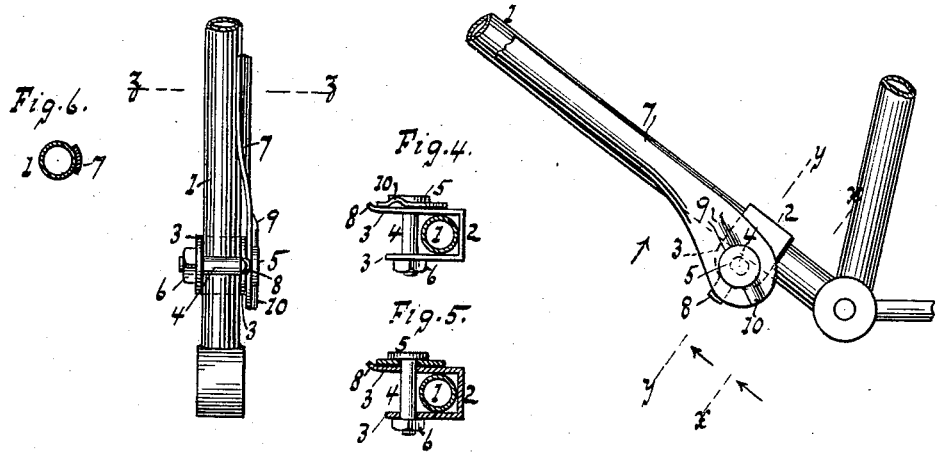

Figure 1 is a side elevation of a bicycle provided with my invention, the parts being represented in the position they occupy when supporting the bicycle in an upright position. Fig. 2 is a detail side elevation showing a portion of the bicycle-frame and representing the supporting-arm in its folded position. Fig. 3 is an inverted plan view of the parts shown in Fig. 2. Fig. 4 is a sectional view taken on the line $x\,x$, Fig. 2. Fig. 5 is a similar view taken on the line $y\,y$, Fig. 2; and Fig. 6 is a similar view taken on the line $z\,z$, Fig. 3.

In order to enable those skilled in the art to make and use my invention, I will now describe the same in detail, referring to the drawings, wherein—

The numeral 1 indicates a cylindrical or tubular part of a bicycle-frame, upon which is mounted a clamp-yoke 2, having approximately parallel side arms 3, which embrace the cylindrical or tubular part 1 of the bicycle-frame. The two arms of the yoke are connected by a transverse bolt 4, having on one end a rigid head 5 and on the opposite end a removable and replaceable screw-nut 6, whereby the clamp-yoke can be rigidly clamped in any desired position upon the cylindrical or tubular part 1 of the bicycle-frame. As will be obvious, the clamp-yoke is adjustable along the length of the inclined part of the bicycle-frame for the purpose of meeting different conditions which may be required to enable the bicycle to be sustained in an upright position through the medium of a supporting-arm 7, which is carried by the yoke. The adjustment of the clamp-yoke enables the device to be applied to bicycles of different size, because the cylindrical or tubular part 1 of the bicycle-frame is ordinarily arranged in an inclined position, and obviously the supporting-arm can be adjusted as may be required to enable it to properly sustain a bicycle of any ordinary height in an upright position whenever required.

The transverse clamping-bolt 4, which serves to clamp the yoke 2 upon the cylindrical or tubular part of the bicycle-frame, also constitutes the means whereby the supporting-arm 7 is pivotally mounted upon the clamp-yoke.

The clamping-bolt extends through a perforation in one extremity of the supporting-arm, and this arm is transversely arched substantially its entire length, so that when folded into a position alongside of and parallel with the cylindrical or tubular part 1 of the bicycle-frame the supporting-arm will closely hug the part 1 of the bicycle-frame and thereby present no undue lateral projection.

The arm 3 of the clamp-yoke, contiguous to the pivoted end of the supporting-arm 7, is formed integral with an extension which constitutes an elastic locking-tongue 8, adapted to spring into engagement with either one of two oppositely-arranged depressions or grooves 9 and 10, formed in the inner side of the pivoted end portion of the arched or concaved supporting-arm 7. The elasticity of the locking-tongue 8 enables the supporting-arm to be disengaged therefrom by suitable pressure applied to this arm.

When the supporting-arm is in its folded position, it lies beside and partially embraces the cylindrical or tubular part 1 of the bicycle-frame, and is thereby sustained in its folded position. When the supporting-arm is swung to its unfolded position, with the parts arranged as shown in the drawings, the elastic tongue 8 will spring into the depression or groove 9 of the supporting-arm whenever this depression or groove is coincident to or registers with the tongue.

The purpose of employing two oppositely-arranged depressions or grooves 9 and 10 in the inner surface of the pivoted end portion of the supporting-arm 7 is to enable this supporting-arm to be used with the clamp-yoke, whether the same be applied to the part 1 of the bicycle-frame with the elastic tongue 8, extending downward, as in Fig. 2, or with the clamp-yoke reversed, so that the elastic tongue lies above the part 1 of the frame and extends upward from the yoke, as will be obvious without further explanation. If the clamp-yoke is reversed and the elastic tongue 8 extends upward therefrom, the depression or groove 10 will coöperate with the elastic tongue to lock the supporting-arm in the position it occupies when sustaining the bicycle in an upright position.

The adjustability and reversibility of the clamp-yoke are very desirable, in that they enable the supporting devices to be applied to a bicycle in different positions to meet different conditions, as may be required.

Having thus described my invention, what I claim is—

1. The combination of a clamp-yoke constructed to embrace a part of a bicycle-frame and having one of its side arms provided with a projecting, elastic, locking-tongue, a transverse clamping-bolt extending through the arms of the yoke and serving to clamp the latter in any desired position upon a part of the bicycle-frame, and a supporting-arm mounted on the clamping-bolt and having the inner side of its pivoted end portion provided with a depression or groove into which the elastic locking-tongue springs when the supporting-arm is in the position it occupies to sustain the bicycle, substantially as described.

2. The combination with the frame of a bicycle, of a clamp-yoke adjustable longitudinally on the bicycle-frame and having two side arms, one of which is formed integral with a projecting, elastic, tongue-piece, a transverse clamping-bolt which serves to clamp the yoke in any position of adjustment on the bicycle-frame, and a swinging supporting-arm pivotally mounted on the clamping-bolt and having the inner side of its pivoted end portion formed integral with a depression or groove into which the locking-tongue springs when the supporting-arm is in the position it occupies to sustain the bicycle, substantially as described.

3. The combination with the frame of a bicycle, of an adjustable and reversible clamp-yoke having two side arms, one of which is provided with a projecting locking-tongue, a transverse bolt extending through the side arms of the clamp-yoke and serving to clamp the latter in any required position to the bicycle-frame, and a swinging supporting-arm pivotally mounted on the clamping-bolt and having the inner side of its pivoted end portion provided with two oppositely-arranged depressions or grooves into either of which the locking-tongue springs when the supporting-arm is in the position it occupies to sustain the bicycle, substantially as described.

In testimony whereof I have hereunto set my hand in the presence of two subscribing witnesses.

SAMUEL A. DARRACH.

Witnesses:
WM. C. HAUFF,
E. F. KASTENHUBER.